United States Patent
White, Sr.

(10) Patent No.: US 10,561,929 B2
(45) Date of Patent: Feb. 18, 2020

(54) GAME SYSTEM FOR ENHANCED COMMUNICATION SKILLS

(71) Applicant: Preston Allen White, Sr., Enterprise, AL (US)

(72) Inventor: Preston Allen White, Sr., Enterprise, AL (US)

(*) Notice: Subject to any disclaimer, the term of this patent is extended or adjusted under 35 U.S.C. 154(b) by 0 days.

(21) Appl. No.: 15/371,942

(22) Filed: Dec. 7, 2016

(65) Prior Publication Data
US 2017/0157503 A1 Jun. 8, 2017

Related U.S. Application Data

(60) Provisional application No. 62/263,962, filed on Dec. 7, 2015.

(51) Int. Cl.
*A63F 3/04* (2006.01)
*G09B 19/04* (2006.01)
*A63F 3/00* (2006.01)
*A63F 11/00* (2006.01)
*A63F 13/847* (2014.01)

(52) U.S. Cl.
CPC ........ *A63F 3/0478* (2013.01); *A63F 3/00895* (2013.01); *A63F 11/00* (2013.01); *A63F 13/847* (2014.09); *G09B 19/04* (2013.01); *A63F 2003/00962* (2013.01)

(58) Field of Classification Search
CPC ........ A63F 3/0478; A63F 13/46; A63F 13/87; A63F 13/847; A63F 11/00; A63F 3/00895; A63F 2011/0079; A63F 2003/00996; A63F 2003/00962; G09B 19/04

See application file for complete search history.

(56) References Cited

U.S. PATENT DOCUMENTS

| | | | | |
|---|---|---|---|---|
| 4,709,926 A * | 12/1987 | DiEgidio | ............ | A63F 3/00138 273/257 |
| 5,111,409 A * | 5/1992 | Gasper | .................... | A63F 13/10 434/167 |
| 5,288,075 A * | 2/1994 | Kelley | ................ | A63F 3/00006 273/243 |
| 6,910,893 B2 * | 6/2005 | Dillhoff | .................... | A63F 1/02 273/299 |
| 7,665,735 B2 * | 2/2010 | Benedict, III | ........ | A63F 3/0423 273/265 |
| 8,727,849 B2 * | 5/2014 | Kevan | ................ | A63F 3/00006 273/243 |
| 2008/0035505 A1 * | 2/2008 | Moore | ...................... | A63F 3/02 206/315.1 |

* cited by examiner

*Primary Examiner* — Jeffrey S Vanderveen
(74) *Attorney, Agent, or Firm* — Bekiares Eliezer LLP (57) ABSTRACT

The present invention provides a game that enhances communication skills. The game provides a series of fun communication challenges utilizing detailed pictures and objects to challenge the descriptive abilities of players and/or teams. It includes processes which reward players according to how well puzzles are answered/solved. The game/system positions players where they must rely solely upon verbal-only explanations/instructions from team members to solve puzzles. It also includes a unique scoring system to accurately score puzzles after each challenge.

18 Claims, 4 Drawing Sheets

```
┌─────────────────────────────────────────────────────────────────────┐
│ EACH ROUND BEGINS WITH AN ILLUMINATOR AND AN ASSEMBLER IN THE       │
│ COMPETITION BOX (IN "SINGLE" AND "TEAM" MODES, ASSEMBLERS AND       │
│ ILLUMINATORS ARE SCORED AS COMPETITORS; IN "TEAM" MODE THEY ARE     │
│ SCORED AS A UNIT)                                                   │
└─────────────────────────────────────────────────────────────────────┘
                                  ↓
┌─────────────────────────────────────────────────────────────────────┐
│ FOR "SINGLE" AND "TEAM" MODE PLAY, THE INDIVIDUAL OR TEAM WHO WILL  │
│ NEXT ROTATE INTO THE COMPETITION BOX ACTS AS THE MODERATOR;         │
│ THERE IS NOT MODERATOR IN "TRAINING" MODE                           │
└─────────────────────────────────────────────────────────────────────┘
                                  ↓
┌─────────────────────────────────────────────────────────────────────┐
│ WITH THE PLAYERS IN THE COMPETITION BOX SEPARATED AND               │
│ FACING AWAY FROM EACH OTHER, THE ILLUMINATOR DRAWS A                │
│ "COMMUNICATION BARRIER" CARD AND READS IT ALOUD                     │
└─────────────────────────────────────────────────────────────────────┘
                                  ↓
┌─────────────────────────────────────────────────────────────────────┐
│ THE TIMER IS STARTED, THE ILLUMINATOR SELECTS A PUZZLE ANSWER SHEET,│
│ THEN INSTRUCTS THE ASSEMBLER TO SELECT THE CORRESPONDING BACKGROUND │
└─────────────────────────────────────────────────────────────────────┘
                                  ↓
┌─────────────────────────────────────────────────────────────────────┐
│ THE ILLUMINATOR GIVES VERBAL INSTRUCTIONS TO THE ASSEMBLER          │
│ TO COMPLETE THE PUZZLE, FOLLOWING THE GAME RULES AND THE            │
│ ADDED RESTRICTION FROM THE "COMMUNICATION BARRIER" CARD,            │
│ WITH THE MODERATOR CALLING ANY RULE VIOLATIONS                      │
└─────────────────────────────────────────────────────────────────────┘
                                  ↓
┌─────────────────────────────────────────────────────────────────────┐
│ WHEN THE TIME RUNS OUT, THE ILLUMINATOR OR ASSEMBLER MAY PURCHASE   │
│ ADDITIONAL WORDS TO ADD INSTRUCTIONS OR ASK A QUESTION; WORDS ARE   │
│ PURCHASED USING PREVIOUSLY EARNED "TALKING POINTS"                  │
└─────────────────────────────────────────────────────────────────────┘
                                  ↓
┌─────────────────────────────────────────────────────────────────────┐
│ AT THE END OF THE ROUND, THE MODERATOR USES THE SCORING TOOL TO     │
│ SCORE THE ROUND ACCORDING TO SCORING RULES FOR THE CURRENT MODE     │
│ OF PLAY                                                             │
└─────────────────────────────────────────────────────────────────────┘
                                  ↓
┌─────────────────────────────────────────────────────────────────────┐
│ THE INDIVIDUAL OR TEAM'S "TALKING POINTS" ARE CALCULATED            │
│ ACCORDING TO THE SCORING RULES, INCLUDING ANY DEDUCTIONS FOR        │
│ RULES VIOLATED DURING THE ROUND; PLAYERS WHO DID NOT VIOLATE        │
│ ANY RULES RECEIVE A "FAIR PLAY COMPENSATION" CARD THAT WILL         │
│ ALLOW THEM TO IMPOSE RULES ON OTHER PLAYERS IN FUTURE ROUNDS        │
└─────────────────────────────────────────────────────────────────────┘
                                  ↓
┌─────────────────────────────────────────────────────────────────────┐
│ PLAY PASSES CLOCKWISE FOR THE NEXT ROUND, PLACING A NEW             │
│ ILLUMINATOR AND ASSEMBLER IN THE COMPETITION BOX                    │
└─────────────────────────────────────────────────────────────────────┘
                                  ↓
┌─────────────────────────────────────────────────────────────────────┐
│ AFTER A PRESET NUMBER OF ROUNDS, THE PLAYER OR TEAM WITH THE        │
│ HIGHEST NUMBER OF "TALKING POINTS" IS DECLARE THE WINNER            │
└─────────────────────────────────────────────────────────────────────┘
```

FIG.9

GAME SYSTEM FOR ENHANCED COMMUNICATION SKILLS

CROSS-REFERENCE TO RELATED APPLICATION

This application claims the benefit of priority of U.S. provisional application No. 62/263,962, filed on Dec. 7, 2015, the contents of which are herein incorporated by reference.

BACKGROUND OF THE INVENTION

The present invention relates to a communication skills game that can be a non-electronic, tabletop game and/or an electronic digital game system.

Conventional board games, tabletop games, and electronic games are not specifically designed to develop communication and communication-related skills/capabilities. Also, they may not provide a fun way of improving listening, trusting, understanding, and describing/explaining capabilities, therefore not improving players' abilities to lessen relationship and team miscommunications. Further, there is a lack of games that effectively provide direct feedback regarding players' communication skills and whether or not such skills are improving.

As can be seen, there is a need for a game that provides entertainment as well as enhancement of the players' communication skills.

SUMMARY OF THE INVENTION

The present invention relates to a method of playing a communication game comprising; providing a game box comprising a box top cover wherein the box top cover is a work station for player 1, a box bottom wherein the box bottom is a work station for player 2, a plurality of first images, each first image showing a background, wherein certain areas or objects of the background are marked, a plurality of second images wherein each second image has a same background as one of the first images, but is not marked, and a plurality of pieces that are markers.

In one aspect of the present invention, player 1 randomly draws from a pile of the first images, wherein the pile is hidden from player 2 by being placed in player 1's work station. Player 1 informs player 2 which corresponding second image to draw from a pile of second images to match the background of the first image drawn by player 1. Player 1 randomly draws a card from a pile of communication barrier cards, the card showing player 1 at least one word he cannot use during a round of play. Player 1 verbally describes the marked objects or areas on the first image for an allotted time period, player 1 not using to the limitation from the communication barrier card. Player 2 listens and marks his second image with the markers based on player 1's description, the second image being placed on player 2's workstation. Player 1 or an alternative player can then score player 2's markings to determine how close in distance they are to player 1's marked image.

In one embodiment, player 1 is an Illuminator and player 2 is an Assembler. In one embodiment, the allotted time is a maximum of about 2 minutes. The alternative player scoring the game can be a Moderator.

In one aspect of the invention, player 1 and player 2 can switch roles, wherein player 2 describes a marked image and player 1 guesses the markers on the unmarked image. The plurality of markers can be cutouts of arrows or cutouts of objects.

In one embodiment, the game can be played with 2 players. In an alternative embodiment, the game is played by a group of people wherein each player is a unique team. In another aspect, the game may be played in team mode, wherein player 1 and player 2 are on a team and play against other teams. In one embodiment, all players rotate such that each gets to play every role in the game. In one aspect of the invention, additional word limitations can be placed on player 1 by opposing team members.

The present invention also includes a method of scoring a communication game comprising providing a game box. The game box comprises a box top cover wherein a game box top cover is a work station for player 1, a box bottom section where the bottom section is a work station for player 2, a plurality of first images, each first image showing a background where certain areas or objects of the background are marked, a plurality of second images wherein each second image has a same background as one of the first images, but is not marked, the second images being sized to fit on player 2's workstation, a plurality of pieces that are markers, and a plurality of transparent sheets, each transparent sheet corresponding to one of the marked first images and one of the unmarked second images, each transparent sheet showing the markings of one the first images.

After the game is played by player 1 and 2 as previously described, player 1 or an alternative player can score player 2's markings to determine the number of points player 2 has earned. In one embodiment, the steps of scoring include placing the corresponding marked transparent sheet on player 2's marked sheet, the transparent sheet sized and configured to fit precisely onto player 2's marked sheet on player 2's workstation. Then player 1 or the alternative player can assess how far in distance player 2's markings are from the markings of the transparent sheet, wherein the transparent sheet provides coded regions showing how many points player 2 receives for each marking based on how close in distance his marking is to the one of the transparent sheet. Each marking can score a range of points. In one embodiment, scoring is based on how similar player 2's markings on the second image are in orientation and distance from the markings of the transparent sheet.

These and other features, aspects and advantages of the present invention will become better understood with reference to the following drawings, description and claims.

BRIEF DESCRIPTION OF THE DRAWINGS

FIG. 9 is a flowchart of general game play.

DETAILED DESCRIPTION OF THE INVENTION

A description of preferred embodiments of the invention follows.

Broadly, an embodiment of the present invention provides a non-electronic tabletop or digital electronic game system that enhances basic communication skills/abilities; i.e., speaking, listening, describing, understanding and team trust, and helps to lessen relationship and team misunderstandings and/or miscommunication. The game focuses on developing relationships through both visual (high-resolution photos) and verbal communication challenges. The game also provides an atmosphere that rewards players for effectively speaking, listening, trusting, understanding, and describing.

More specifically, the game/system provides a series of fun communication challenges utilizing detailed pictures and objects to challenge the descriptive abilities of players and/or teams. It includes processes (outlined in game rules included in game box) which reward players according to how well puzzles are solved. The game positions players where they must rely solely upon verbal-only instructions from team members to solve puzzles. It also includes a unique scoring system to accurately score puzzles after each challenge.

Advantageously, the game provides direct feedback regarding the players' communication skills. Additionally, it can show if the players' skills are improving over time.

Figure 1:
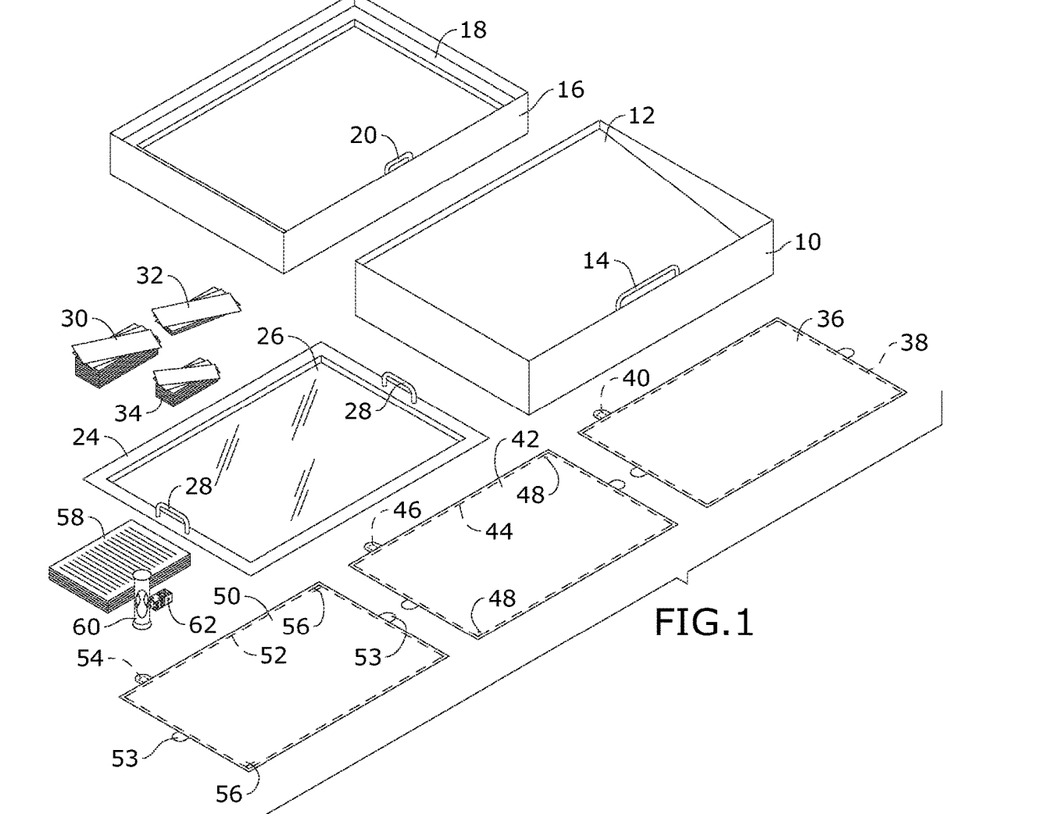
FIG. 1 is a perspective view of exemplary game components.
Figure 2:
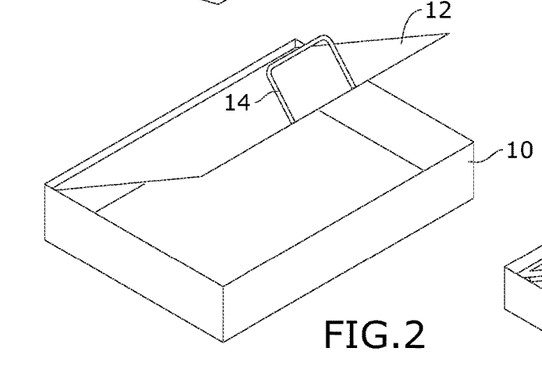
FIG. 2 is a perspective view of an illuminator's workstation.
Figure 4:
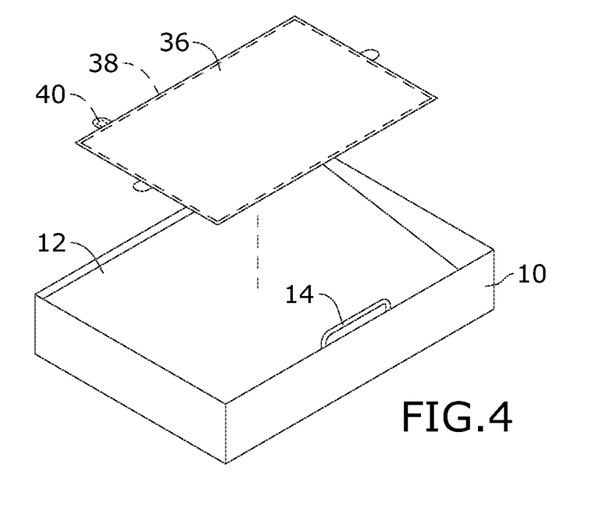
FIG. 4 is an exploded view of a workstation and answer sheet.

Referring now to the drawings, in one embodiment, a game system includes a plurality of components in a box. As shown in FIG. 1, the game box can include an Illuminator's workstation 10. The illuminator's workstation 10 can be the top of the game system box. The illuminator's workstation 10 includes a fold-up lid 12 and a storage area within or underneath the lid 12, as shown in FIGS. 2 and 4. The lid 12 can be a sheet or board attached to the inside of the workstation 10 with hinges or any suitable attachment that allows for foldable movement. The lid 12 can include a handle 14 to lift and reveal the storage area. The storage area can store a plurality of Illuminator answer sheets 36, scoring sheets 58, a timing device 60, or any other game components.

Figure 3:
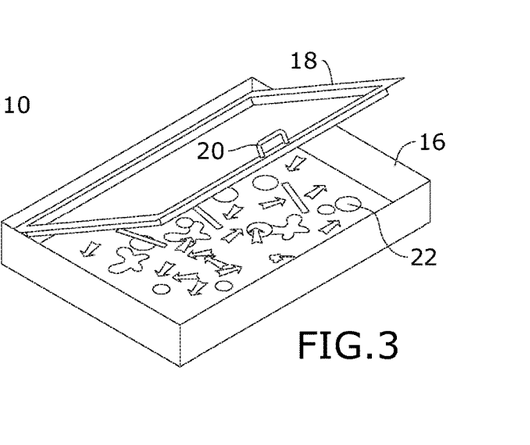
FIG. 3 is a perspective view of an assembler's workstation.

In one embodiment, an Assembler's workstation 16 can be the bottom of the game box. The Assembler's work station 16 can include a fold up lid 18. The lid 18 can be attached to the inside of the workstation 16 with hinges or any suitable means to maintain movement. The lid 18 can fold up to expose a storage area underneath. The lid 18 can include a handle 20 to pull up the lid. As shown in FIG. 3, the storage area can be used for storing puzzle pieces 22, a plurality of Assembler's backgrounds 42, or any game components.

The game system can also include the timing tool 60, such as a sand timer to time each player's respective playing time. The game system can also include dice 62, to determine the order of players.

In one embodiment, the game includes a scoring tool 24 and a plurality of transparent scoring sheets 50. The scoring tool 24 includes a recessed area 26 in which the transparent scoring sheet 50 can be positioned. As shown in the exploded view of FIG. 5, once the transparent scoring sheet 50 is placed on the scoring tool 24, a set of handles 28 on the scoring tool 24 can be used to lift and place the scoring tool 24 directly on top of the Assembler's background 42 on workstation 16 for accurate scoring. Each scoring sheet 50 can include scoring alignment crosshairs 56 and each Assembler's background 42 can include alignment dots 48 to ensure that the scoring sheet 50 and the Assembler's background 42 are properly aligned on the scoring tool 26.

Figure 5:
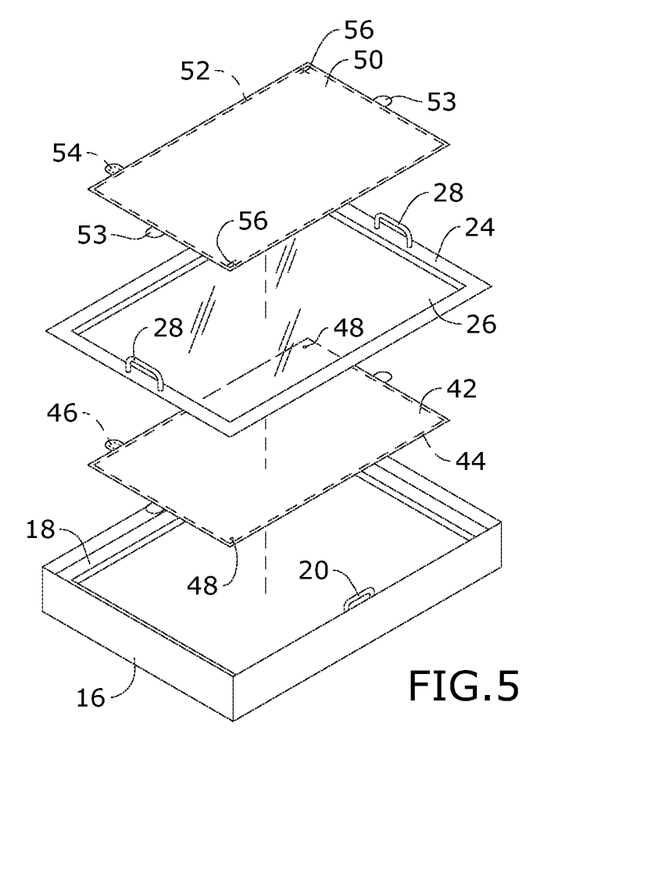
FIG. 5 is an exploded view of assembler's workstation with scoring components.

In one embodiment, the scoring tool 24 can be manufactured using a 0.05×14.25×20.25" cardboard frame. The transparent score sheets(s) 50 can be manufactured using a clear Plexiglass sheet that can be 0.05×12×18" in size. The handles 28 can be made of any suitable material, wherein a preferable material is cardboard. It should be understood that the materials and dimensions of any of the components can be any suitable materials or dimensions.

In one embodiment, the transparent score sheets 50 serve as an answer sheet for any game puzzle. Each puzzle can have its own dedicated transparent score sheet 50, Illuminator's answer sheet 36, and Assembler's puzzle backgrounds 42. The transparent scoring sheets 50, Illuminator's answer sheets 36, and Assembler's puzzle backgrounds 42 can respectively have identification numbers 54, 40, and 46 that show they are related to the same puzzle.

In one embodiment, the Illuminator's answer sheets 36 can be high resolution images 38 depicting various puzzle challenges with their answers. The answers can be shown with markings. In one embodiment, the markings can be depicted with arrows or images of objects. Markings can, however, be any suitable way of marking the answers.

In one aspect of the invention, Assembler's puzzle backgrounds 42 are high resolution images upon which Assemblers can assemble puzzles per the Illuminator's verbal instructions.

In one embodiment, the game can include a plurality of puzzle pieces 22, which can be used to assemble certain puzzles by the Assembler based on the Illuminators verbal instructions. In one embodiment, the puzzle pieces can be cutouts of arrows or other objects. The game can further include a plurality of Communication Barrier Cards 30. Each Communication Barrier Card 30 can impose a specific communication limitation(s) upon the illuminator.

In one embodiment, the game can include Fair-Play Compensation Cards 32. Fair Play Compensation Cards 32 can give team players the authority to create and impose a strategic rule or restriction against an opposing team player, making it more difficult for the opposing team member to earn Talking Points during timed game play. Talking points can be word currency game points or bills 34 that can be earned in communication challenges that may be exchanged for More Time to Talk, or extra time that players may use to ask a question or provide a valuable hint.

In one embodiment, the game begins by reading the game rules that are included in the game box. Players are divided into three roles or groups; Illuminators deliver instructions; Assemblers receive the Illuminator's instructions and assemble puzzles; and Moderators watch for rule breakers, assess any needed penalties, and keep score.

Each player position fulfills a specific function to enable game progression. The applicant has chosen names specific to the responsibilities of each player position and does not seek to prevent other inventors from using the names in non-related claims. However, as it relates to communication and relationship games/activities, the applicant seeks to Claim the use of specifically named player positions (i.e., Illuminator, Assembler).

In one embodiment, the Assembler's goal is to listen carefully to the illuminator's instructions and trust those instructions to correctly assemble the answer before time runs out. The Assembler's role is to accurately interpret the Illuminator's instructions to recreate the Illuminator's puzzle answer. The Assembler may not be permitted to speak or look at the Illuminator while playing in the Assembler position. All assembly is accomplished by receiving and following the verbal-only guidance and direction of the Illuminator. Therefore, team trust is important for success.

In one embodiment, the Illuminator's goal is to verbally explain the puzzle answer in enough detail and in the shortest possible time to enable the Assembler to assemble the answer to the puzzle. Illuminators may not use linear measurement in any description.

In one embodiment, the Moderator can help to ensure that rules are followed. After each puzzle is assembled, the Moderator uses the Scoring Tool 24 to score puzzles and record player's scores on score sheets 58. The Moderator may also issue More Time to Talk privileges when earned, monitor the game clock, and assess point deductions/penalties for breaking game rules.

The game can contain two types puzzle challenges. In the Position & Orientation puzzle, teams describe and assemble puzzles that require puzzle piece placement accuracy that is measured and scored according to puzzle piece position and orientation. For example, an Illuminator can randomly choose one of the Illuminator answer sheets 36 from his storage space, which shows an image of any scene etc.

The Illuminator's puzzle answer sheet 36 can show arrows or objects strategically positioned in certain positions and with orientations, (for example, rotated clockwise, upside down, etc.) The Assembler can then utilize the Illuminator's verbal-only instructions to determine where and in what orientation to place a plurality of five separate puzzle pieces 22 during the communication challenge.

The Position and Orientation Challenge may utilize a unique scoring system referred to as the "position & orientation" scoring method. In operation, the transparent scoring sheet 50 is placed on the scoring tool 24 which is positioned on the assembler background 42 on the assembler's workstation 16. This scoring method awards points for puzzle piece positioning and orientation accuracy. For example, on the scoring graphic area 52 of the transparent score sheet 50, each of five puzzle pieces 22 is correctly positioned and marked with two numbers which are scoring reference points. The number "2" designates position accuracy and number "3" demonstrate orientation accuracy.

Therefore, using the Position and Orientation scoring method, a puzzle piece can be worth 1 point if the Assembler's puzzle piece touches any portion of the correctly positioned puzzle piece, 2 points if the puzzle piece is in the right position, or 5 points (2+3) if the puzzle piece is in both the right position and the right orientation. Thus, in this embodiment, players may only receive 1, 2, or 5 points per puzzle piece for a maximum of 25 points for perfect play.

A second type of challenge can be a Location Accuracy Challenge. In this embodiment, teams can accurately describe and locate various physical locations and/or landmarks within a puzzle challenge. This challenges the Illuminator to describe, in the quickest and most accurate manner possible, the exactly location of 5 locations/places or objects.

For example, on the Illuminator's puzzle answer sheet 36, each target object/physical location/or landmark is marked by an arrow on the given background. Five arrows can point to five exact targets that the illuminator describes to the Assembler. The Assembler has a plurality of puzzle pieces 22 that can be cutouts of arrows. The Assembler can place these on Assembler's puzzle sheet 42; the same background image as the Illuminator's answer sheet 36, but without the arrows. The Assembler will utilize the Illuminator's verbal-only instructions to determine where to place five separate arrow cutouts 22 during a communication challenge.

The Location and Accuracy Challenge can be scored using a unique Red Dot Scoring method, using the transparent scoring sheet 50. This scoring method awards points for three levels of location description/arrow placement accuracy as shown on the transparent scoring sheet 50. Assemblers can earn 1 point for all arrows pointed within a yellow region; 2 points for all arrows pointed within a Red-Dot area, and 5 points for arrows in a blue cross area (the most accurate.)

After the game time for a team has lapsed, the Moderator can use the scoring tool 24 and transparent score sheet 50 to score the completed puzzle.

In one embodiment, the game can be played in three different modes; a Training Mode, a Single Mode, and a Team Mode.

Figure 6:
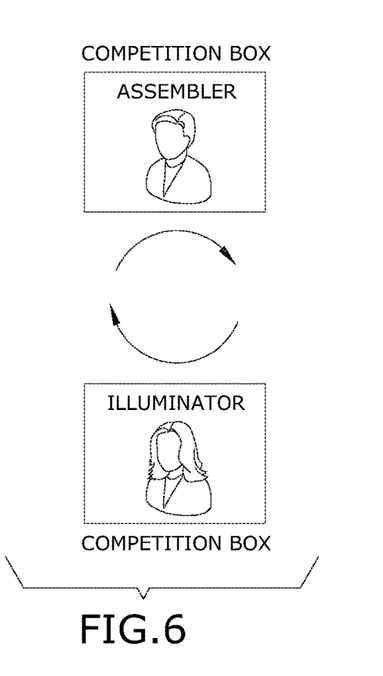
FIG. 6 is a schematic view of playing a game in training mode.

The Training Mode can include two players. Players can compete against each other and each player can take turns playing in the Illuminator and Assembly positions. A schematic of playing in the Training Mode is shown in FIG. 6. To begin playing in Training Mode, players may roll the dice 62 to determine who plays first as the Illuminator.

The Illuminator and Assembler will face away from one another and separate by at least two feet to ensure there is no communication via body language. Next, the Illuminator will draw the Communication Barrier Card 30, which imposes a specific communication limitation, from the top of the stack and read the card out loud. Once the card is read, it is placed at the bottom of the stack. The timing device 60 is then started.

Next, the Illuminator can quickly pull one of the Illuminator answer sheets 36 from the puzzle storage area in his Illuminator workstation 10. He can then inform the Assembler which corresponding puzzle background sheet 42 to obtain according to the corresponding identification number on the puzzle answer sheet 36. The Assembler can then pull the matching background sheet 42 from underneath the Assembler workstation 16.

In one embodiment, the Illuminator can describe the puzzle to the Assembler for up to a 2-minute time frame, timed by the timing device 60. Preferably, Illuminator will closely follow the rule(s) directed by the Communication Barrier Card 30 and communicate with the Assembler to describe the puzzle answer in the quickest, most accurate manner possible.

Only the Illuminator may be allowed to see the puzzle answer sheet 36 during timed game play. In one embodiment, the Assembler may not speak to or look at the Illuminator during timed game play, but may only utilize the Illuminator's verbal instructions to assemble the puzzle.

After a puzzle is completed, players can use the Scoring Tool 24 to determine the Assembler's score. In one embodiment, the Illuminator's score is separate from the Assembler's score and is one half of what the Assembler scores as determined by the Scoring Tool 24 and transparent score sheet 50. Because there are only two players in the Training Mode, there is no Moderator and the players may score each other's puzzles. Due to the shared score, both players have the incentive to put in their best efforts considering they are opponents in this version of the game.

In one aspect of the invention, the Assembler may receive an additional 5-point bonus if the Illuminator broke the Communication Barrier Card rule during puzzle assembly. Likewise, if the Assembler speaks during puzzle assembly, the Illuminator may receive a 5-point bonus. However, if the Assembler speaks during puzzle assembly and the Illuminator breaks the communication barrier card rule, neither player receives a 5-point bonus. Players can record their scores on a score sheet 58, switch positions, and play again until each player has played as Illuminator and Assembler.

After the round is completed, the Illuminator can place the completed puzzle answer 36 at the bottom of the puzzle stack within the puzzle storage area.

Each time a player enters the Illuminator position, he pulls a new puzzle answer 36 from the puzzle storage area. One round is complete after each player has played the Illuminator position and thus entered the Competition Box. In a two-player game, preferably players can play an odd number of rounds (1, 3, 5, 7, etc.) to ensure there is a chance for a tie-breaker if needed. After players have completed the agreed upon number of rounds, the player with the highest score wins the game.

Figure 7:
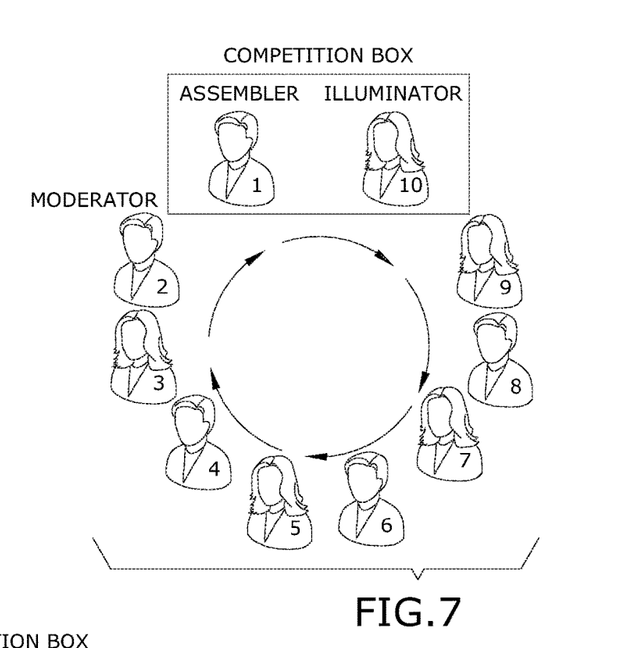
FIG. 7 is a schematic view of playing the game in single mode.

A schematic of playing in Single Mode is shown in FIG. 7. In Single Mode, each player competes against all other players. In one embodiment, there are 3-10 players although the number of players can vary. Players can rotate into and out of the Competition Box, which includes the Illuminator and Assembler positions.

In the Competition Box, each time a new player enters the Illuminator position, he pulls a new puzzle answer from the puzzle storage area. When players are not in the Competition Box, they will rotate into the Moderator position as game play progresses. The player in the Moderator position will monitor the Illuminator and Assembler to ensure no game rules are broken.

After each round, the Moderator can score according to the Position and Orientation Scoring System or the Red Dot Scoring System, depending on which puzzle challenge is completed. The Moderator can record each player's scores on the score sheet 58. As shown in the schematic, all players will rotate in a clockwise manner, until each player has played once in each of the player positions. After players play the Illuminator and Assembler positions, they will exit the Competition Box and the next players in the rotation will enter the Competition Box. This completes a single round of play. Players who are not in the Competition Box are encouraged to watch, learn, and enjoy until it is their turn to enter the Competition Box.

In one embodiment, the Illuminator and Assembler have 2 minutes to complete the puzzle to the best of their ability. Thus, one round with 10 players may be finished in approximately 20 minutes. Players can decide how many rounds will be played before the game begins. After all players have played all three positions and all agreed upon rounds are complete, the player with the highest score wins the game.

Figure 8:
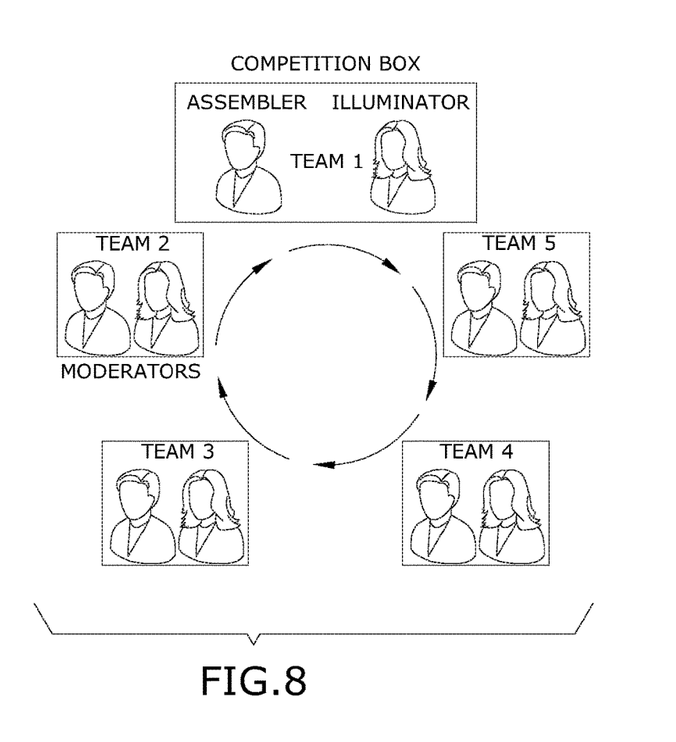
FIG. 8 is a schematic view of playing the game in team mode.

A schematic of the game being played in Team Mode is shown in FIG. 4C. In Team Mode, a team includes 2 players. Therefore, 10 players can be 5 teams. In cases where there are an odd number of total players, players may elect to compete in Single Mode (or each player being his own team) as it is preferable for an odd number of players. In one embodiment, the Team Mode can include 4-10 players.

In Team Mode, teams rotate in a clockwise manner into and out of the Competition Box, which consists of the Illuminator and Assembler positions. Teams can rotate into the Illuminator and Assembler positions until each team member has played as Illuminator and Assembler at least one time while in the Competition Box.

The role of each player remains the same in all 3 modes of playing, except that there is no Moderator in the Training Mode. The game is played by the same method and same rules in all three playing modes. A flowchart of general game play is shown in FIG. 9.

In one embodiment, Fair-play Compensation Cards 32 can give teams/players the authority to create and impose a strategic rule or restriction against an opposing team/player, making it even harder for the opposing team/player to earn Talking Points (described below) during timed game play. However, the Fair-play Compensation Card 32 can only be used for one puzzle challenge and can only restrict the use of one predetermined word during timed game play. This card can be very useful when opposing teams know their opponent's communication style during timed game play.

For example, one Fair Play Compensation Card 32 can say "When illuminating, you cannot say the word, 'left'." The Fair-play Compensation Card 32 only restricts Illuminator communications occurring during timed game play. A clever word restriction could thus present problems for opposing teams/players.

Fair Play Compensation Cards 32 may be awarded to players or teams that complete an entire round without breaking any rules. One Fair Play Compensation card 32 can be earned per team if playing in Team Mode; otherwise, each person may earn a single card. This card may be used during any round after the round in which it was earned or awarded.

Fair-play Compensation Cards 32 are played before the targeted Illuminator reads the Communication Barrier Card 30 as the Fair Play Compensation cards 32 will serve as an additional communication limitation on the Illuminator. Therefore, the targeted Illuminator will follow the instructions on the Communication Barrier Card 32 as well as the restriction imposed by the Fair-play Compensation Card owner. In cases where no additional rounds will be played, the Fair-play Compensation Card can be converted into ten Talking Points or currency bills 34.

In one embodiment, any player can randomly draw a Communication Barrier Card 30 that additionally grants the Fair-play Compensation Card 32 grace privilege. In one embodiment, there is only one such card that awards this privilege in the stack of Communication Barrier Cards 30. This reward may be used in any round.

In one embodiment, More Time to Talk is one minute of additional talking time that is granted to Assemblers or Illuminators to ask questions or provide helpful hints. More Time to Talk can be earned using a players' Talking Points or bills 34.

Talking Points or bills 34 are awarded to players/teams after each puzzle is completed, if the player or team scored points. Talking Points represent the number of points a player/team accumulates for communication/puzzle assembly accuracy or their score after the game clock elapses.

Talking Points or bills 34 can be awarded in denominations of $1, $3, or $5 and can be used as a form of word currency. Assemblers or Illuminators may use their earned currency to request More Time to Talk. However, if used as word currency, the Talking Points are subtracted from player/team point scores. Talking Points or bills 34 used as word currency are considered an investment in strategies that may earn even more Talking Points. Therefore, if a team accumulates enough Talking Points, this valuable word currency may be exchanged for the right to provide additional instructions, ask questions, or provide quick hints to team members.

To use Talking Points, players wait until after the game clock elapses. Only one player (Illuminator or Assembler) can receive More Time to Talk. The player who wants more time to talk speaks up immediately after the game clock has elapsed to make the request to the Moderator. The player who requests more time to talk first will be granted their request if they have enough Talking Points or bills 34 to exchange. The Talking Points or bills 34 are used to purchase additional words by the following currency exchange:

The Cost/Investment To Exchange Talking Points for 1-3 Words: $2 Talking Points

The Cost/Investment To Exchange Talking Points for 4-6 Words: $3 Talking Points

The Cost/Investment To Exchange Talking Points for 7-10 Words (ten-word per puzzle purchase limit): $5 Talking Points If the purchasing player says more words than he/she purchased, the purchaser must immediately pay for the additional word(s) with additional currency or the more time to talk privilege will be revoked. Talking Points are nonrefundable.

It is to be understood that if a player chooses to say a word repeatedly, each use of any word counts toward the total number of words purchased.

The Assembler can use Talking Points as an opportunity to ask a question and/or request clarification on something the Illuminator said during timed game play. The Illuminator may only answer the Assembler's question using ten words or less. Using more than ten words to answer a question revokes the more time to talk privilege. Also, Talking Point purchases are nonrefundable.

The Illuminator can use Talking Points to provide additional hints or direction to the Assembler, while still following the Communication Barrier Card 30 and/or the Fair Play Compensation limitations 32. The Assembler can only listen and is not allowed to speak.

The game can be used in many environments. For example, the game may be used as a fun party game, a team building game, a children's communication training tool, or even by couples to improve their communication skills. Advantageously, the game can be used to measure the player's improving communication and listening skills based on the number of points he accumulates over each round. Also, a player can track his progress over time by playing the game over and over with the same or different players.

In one embodiment, the game includes sixty Illuminator Puzzle Answers 36, sixty Transparent Score Sheets 50, thirty-two Assembler's Puzzle Backgrounds 42 (since the assembler backgrounds can be used for more than one puzzle), one hundred Puzzle Pieces 22, the Scoring Tool 24, twenty-one Communication Barrier Cards 30, five Fair-play Compensation Cards 32, Talking Point word currency bills 34 (80×$1, 60×$3, and 59×$5=$555 in Talking Point word currency), eighty Score Sheets 58, the timer 60, and dice 62. It should be understood that the number of components can vary. In one embodiment, additional components can be purchased via multiple avenues (stores, online, etc.)

In one embodiment, the game is intended for children over 12. The game can, however, be played by younger children to improve communication skills.

Though the described game is played using a game box and physical components, in alternative embodiments, the game can be played electronically, via a software application on a smart device, such as a computer, laptop, table, phone, and the like.

It should be understood, of course, that the foregoing relates to exemplary embodiments of the invention and that modifications may be made without departing from the spirit and scope of the invention as set forth in the following claims.

What is claimed is:

1. A method of playing a game comprising; providing a game box comprising:
   a box top cover wherein a game box top cover is a work station for player 1;
   a box bottom where the bottom is a work station for player 2;
   a plurality of first images, each first image showing a background, wherein certain areas or objects of the background are marked;
   a plurality of second images wherein each second image has a same background as one of the first images, but is not marked;
   a plurality of pieces that are markers;
   randomly drawing the first image from a pile of the first images by the player 1, wherein the pile is hidden from player 2 by being placed in player 1's workstation, player 1 informing player 2 which second image to draw from a pile of second images to match the background of the first image drawn by player 1;
   randomly drawing a card from a pile of communication barrier cards by player 1, the card showing player 1 at least one word player 1 cannot use during a round of play;
   verbally describing the marked objects or areas by player 1 of the first image for an allotted time period, player 1 not using the word from the communication barrier card;
   marking the second image with the markers by player 2 based on player 1's verbal description, the second image being placed on player 2's workstation; and
   scoring by player 1 or an alternative player of player 2's markings to determine a distance between player 2's markings and the markings of player 1's marked first image.

2. The method of claim 1, wherein player 1 is an Illuminator delivering instructions to player 2, and player 2 is an Assembler receiving instructions from player 1 and assembling puzzles based on the received instructions.

3. The method of claim 1, wherein the allotted time is a maximum of 2 minutes.

4. The method of claim 1, Wherein the player scoring the game is the Moderator.

5. The method of claim 1, wherein the Illuminator and the Assembler switch roles, wherein the Assembler assumes the roles of Illuminator and describes the marked image and the Illuminator assumes the role of Assembler and guesses the markers on the unmarked image.

6. The method of claim 1, wherein the markers are cutouts of arrows.

7. The method of claim 1, wherein the markers are cutouts of objects.

8. The method of claim 1, wherein the game is played with 2 players.

9. The method of claim 1, wherein the game is played by a group of people wherein each player is one team.

10. The method of claim 1, wherein the game is played in team mode, wherein player 1 and player 2 are a team and play against other teams.

11. The method of claim 1, wherein all players rotate such that each gets to play every role in the game.

12. The method of claim 1, wherein an additional one-word restriction will be placed on an illuminator by opposing players.

13. The method of claim 1, wherein corresponding first and second images show an identical identification number.

14. A method of scoring a communication game comprising;
provided a game box comprising;
a box top cover wherein a game box top cover is a work station for player 1;
a box bottom where the bottom is a work station for player 2;
a plurality of first images, each first image showing a background where certain areas or objects of the background are marked;
a plurality of second images wherein each second image has a same background as one of the first images, but is not marked, the second images being sized to fit on player 2's workstation;
a plurality of pieces that are markers;
a plurality of transparent sheets, each transparent sheet corresponding to one of the marked first images and one of the unmarked second images, each transparent sheet showing the markings of one of the first images;
verbally describing the marked objects or areas by player 1 of the first image player 1 draws for an allotted time period, the first image being hidden from player 2 by being placed on player 1's workstation;
marking the second image with the markers by player 2 based on player 1's verbal description, the second image being positioned on player 2's workstation;
scoring of player 2's markers by player 1 or an alternative player to determine the number of points player 2 has earned comprising:
placing the corresponding marked transparent sheet on player 2's marked second image, the transparent sheet sized and configured to fit precisely onto player 2's marked second image on player 2's workstation; and
using a set of coded regions on the transparent sheet, the coded regions showing how many points player 2 earns for each marking based on how close in distance each of player 2's markings is to the markings on the corresponding transparent sheet, each marking capable of scoring a range of points.

15. The method of claim 14, wherein each marked area is worth between 0 and 5 points.

16. The method of claim 14, wherein each image shows 5 marked areas or objects.

17. The method of claim 14, wherein player 2 is also scored based on how similar player 2's markings are in orientation from the markings on the transparent sheet.

18. The method of claim 14, wherein the transparent score sheet is placed on the scoring tool and the scoring tool is placed on the Assembler's marked first image on the Assembler's workstation.

* * * * *